US012703383B2

(12) United States Patent
Du Toit et al.

(10) Patent No.: US 12,703,383 B2
(45) Date of Patent: Aug. 11, 2026

(54) SYSTEMS AND METHODS FOR NAVIGATING A VEHICLE BY DYNAMIC MAP CREATION BASED ON LANE SEGMENTATION

(71) Applicant: Kodiak Robotics, Inc., Mountain View, CA (US)

(72) Inventors: Philip C. Du Toit, Fort Collins, CO (US); Akshay Khatri, Mountain View, CA (US); Andreas Wendel, Mountain View, CA (US); Zachais Vawter, Sunnyvale, CA (US); Collin C. Otis, Driggs, ID (US); Ryan T. Lee, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 76 days.

(21) Appl. No.: 18/155,378

(22) Filed: Jan. 17, 2023

(65) Prior Publication Data

US 2024/0239368 A1 Jul. 18, 2024

(51) Int. Cl.

*B60W 60/00* (2020.01)
*G06V 10/26* (2022.01)
*G06V 10/34* (2022.01)
*G06V 20/56* (2022.01)

(52) U.S. Cl.

CPC ........... *B60W 60/001* (2020.02); *G06V 10/26* (2022.01); *G06V 10/34* (2022.01); *G06V 20/588* (2022.01); *B60W 2552/00* (2020.02)

(58) Field of Classification Search

None

See application file for complete search history.

(56) References Cited

U.S. PATENT DOCUMENTS 10,423,840 B1 * 9/2019 Kim .......................... G08G 1/04
2015/0117723 A1 * 4/2015 Joshi .................... G06V 30/422 382/113
2016/0180177 A1 6/2016 Nguyen et al.
(Continued)

OTHER PUBLICATIONS

Kurbatova, E.E. et al., "Detection of Roads from Images Based on Edge Segmentation and Morphological Operations," 2019 8th Mediterranean Conference on Embedded Computing (Year: 2019).*
(Continued)

*Primary Examiner* — Madison R. Inserra

(74) *Attorney, Agent, or Firm* — Fox Rothschild LLP

(57) ABSTRACT

This disclosure provides methods and systems for dynamically creating a trajectory for navigating a vehicle. The method may include receiving sensor data from at least one sensor of the autonomous vehicle, the sensor data representative of a driving surface in a field of view of the autonomous vehicle; segmenting a portion of the driving surface in the field of view of the autonomous vehicle by determining nominal path based at least in part on the image data; assigning a plurality of nodes to at least a portion of the nominal path; associating the plurality of the nodes assigned to the nominal path with a line to generate at least one segmentation polyline; determining updated nominal path by fitting the each of the plurality of segmentation lines to the nominal path; generating a trajectory based on the updated nominal path; and navigating the autonomous vehicle according to the trajectory.

18 Claims, 8 Drawing Sheets

(56) References Cited

U.S. PATENT DOCUMENTS

| | | | | |
|---|---|---|---|---|
| 2020/0098135 | A1 | 3/2020 | Ganjineh et al. | |
| 2020/0324795 | A1 | 10/2020 | Bojarski et al. | |
| 2021/0019897 | A1* | 1/2021 | Biswas | G06T 7/11 |
| 2022/0274601 | A1 | 9/2022 | Jia et al. | |
| 2023/0004164 | A1 | 1/2023 | Onofrio et al. | |
| 2023/0162511 | A1* | 5/2023 | Saida | G06V 20/588<br>382/103 |

OTHER PUBLICATIONS

Devane, Vighnesh et al., "Lane Detection Techniques using Image Processing," Aug. 9, 2021, ITM Web Conf., International Conference on Automation, Computing and Communication 2021 (ICACC-2021) vol. 40 (Year: 2021).*

Siedentop, Christoph et al., "Path-Planning for Autonomous Parking with Dubins Curves," 2015, Uni-DAS Workshop Fahrerassistenzsysteme (Year: 2015).*

Kim, Seokwon et al., "Probabilistic Smoothing Based Generation of a Reliable Lane Geometry Map With Uncertainty of a Lane Detector," Sep. 10, 2020, IEEE Access, vol. 8, pp. 170322-170335 (Year: 2020).*

* cited by examiner

SYSTEMS AND METHODS FOR NAVIGATING A VEHICLE BY DYNAMIC MAP CREATION BASED ON LANE SEGMENTATION

FIELD

This disclosure relates generally to systems and methods for navigating a vehicle by dynamically creating maps based on lane segmentation.

BACKGROUND

Autonomous vehicles refer to vehicles that replace human drivers with sensors, computer-implemented intelligence, and other automation technology. Autonomous vehicles can be used to aid in the transport of passengers or items from one location to another. For autonomous vehicles to operate safely in all environments, the autonomous vehicles must be capable of effectively performing vehicle maneuvers, such as lane keeping, lane changing, lane splits, turns, stopping and starting at intersections, crosswalks, and the like, and/or other vehicle maneuvers. For example, for an autonomous vehicle to navigate through surface streets and on highways, the autonomous vehicle is required to navigate an often rapidly moving vehicle among one or more divisions (e.g., lanes, intersections, crosswalks, boundaries, etc.) of a road that are often minimally delineated, and may be difficult to identify in certain conditions even for the most attentive and experienced drivers.

Therefore, there is a need for effective systems and methods for navigating a vehicle in response to various changing conditions in its environment.

SUMMARY

This disclosure addresses the above need in a number of aspects. In one aspect, this disclosure provides a method for dynamically creating a trajectory for navigating a vehicle. In some embodiments, the method comprises receiving sensor data from at least one sensor of the autonomous vehicle, wherein the sensor data (e.g., image data) is representative of a driving surface in a field of view of the autonomous vehicle; and using a processor: (a) segmenting a portion of the driving surface in the field of view of the autonomous vehicle by determining a nominal path based at least in part on the sensor data; (b) assigning a plurality of nodes to at least a portion of the nominal path; (c) associating the plurality of the nodes assigned to the nominal path with a line to generate at least one segmentation polyline; (d) determining an updated nominal path by fitting the each of the plurality of segmentation lines to the nominal path; (e) generating a trajectory based on the updated nominal path; and (f) navigating the autonomous vehicle according to the trajectory.

In some embodiments, the nominal path may be determined or represented by any road attributes, such as lane lines, lane edges, road edges, road boundaries, centerlines, road surface from an image, road surface from LIDAR, etc.

In some embodiments, the step of segmenting comprises dilating and skeletonizing the nominal path. In some embodiments, the step of segmenting comprises dilating and skeletonizing the nominal path prior to assigning the plurality of nodes to at least the portion of nominal path. In some embodiments, the step of segmenting comprises applying a gaussian blur to the nominal path to generate blurred segmentation.

In some embodiments, the step of segmenting comprises segmenting the driving surface with a lane detection segmentation model, such as a vector-valued function. In some embodiments, the step of segmenting comprises segmenting the driving surface into rectangular grids represented by a matrix with a range of about 100 meters and a width of about 20 meters.

In some embodiments, the step of associating the plurality of the nodes comprises incrementally associating nodes near to the autonomous vehicle to nodes further to the autonomous vehicle through angle optimization. In some embodiments, the method comprises extending the at least one segmentation polyline by incrementally associating additional nodes in an adjacent portion of the driving surface that is further to the autonomous vehicle.

In some embodiments, fitting the at least one segmentation polyline comprises minimizing curvature change between two adjacent sets of nodes on the same segmentation line. In some embodiments, fitting the at least one segmentation polyline comprises maximizing match between the each of the plurality of segmentation lines with the nominal path.

In some embodiments, a curvature of at least one of the two adjacent sets of nodes is defined by a Menger Curvature function. In some embodiments, at least one of the two adjacent sets of nodes comprises three nodes.

In some embodiments, the step of generating the trajectory comprises generating the trajectory by updating an existing trajectory or generating a new trajectory.

In another aspect, this disclosure also provides a system for dynamically creating a trajectory for navigating an autonomous vehicle. In some embodiments, the system comprises at least one sensor, configured to receive sensor data (e.g., image data) representative of a driving surface in a field of view of the autonomous vehicle; and a processor, configured to: (i) segment a portion of the driving surface in the field of view of the autonomous vehicle by determining a nominal path based at least in part on the sensor data; (ii) assign a plurality of nodes to at least a portion of the nominal path; (iii) associate the plurality of the nodes assigned to the nominal path with a line to generate at least one segmentation polyline; (iv) determine updated nominal path by fitting the at least one segmentation polyline to the nominal path; (v) generate a trajectory based on the updated nominal path; and (vi) navigate the autonomous vehicle according to the trajectory.

In some embodiments, the processor is configured to dilate and skeletonize the nominal path. In some embodiments, the processor is configured to dilate and skeletonize the nominal path prior to assigning the plurality of nodes to at least the portion of nominal path. In some embodiments, the processor is configured to apply a gaussian blur to the nominal path to generate blurred segmentation.

In some embodiments, the processor is configured to segment the driving surface with a lane detection segmentation model. In some embodiments, the processor is configured to segment the driving surface into rectangular grides represented by a matrix with a range of about 100 meters and a width of about 20 meters.

In some embodiments, the processor is further configured to incrementally associate nodes near to the autonomous vehicle to nodes further to the autonomous vehicle through angle optimization. In some embodiments, the processor is further configured to extend the at least one segmentation polyline by incrementally associating additional nodes in an adjacent portion of the driving surface that is further to the autonomous vehicle.

In some embodiments, the processor is configured to minimize curvature change between two adjacent sets of nodes on the same segmentation line. In some embodiments, the processor is configured to maximize match between the each of the plurality of segmentation lines with the nominal path.

In some embodiments, a curvature of at least one of the two adjacent sets of nodes is defined by a Menger Curvature function. In some embodiments, at least one of the two adjacent sets of nodes comprises three nodes.

In some embodiments, the processor is further configured to generate the trajectory by updating an existing trajectory or generating a new trajectory.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

DETAILED DESCRIPTION

Figure 1:
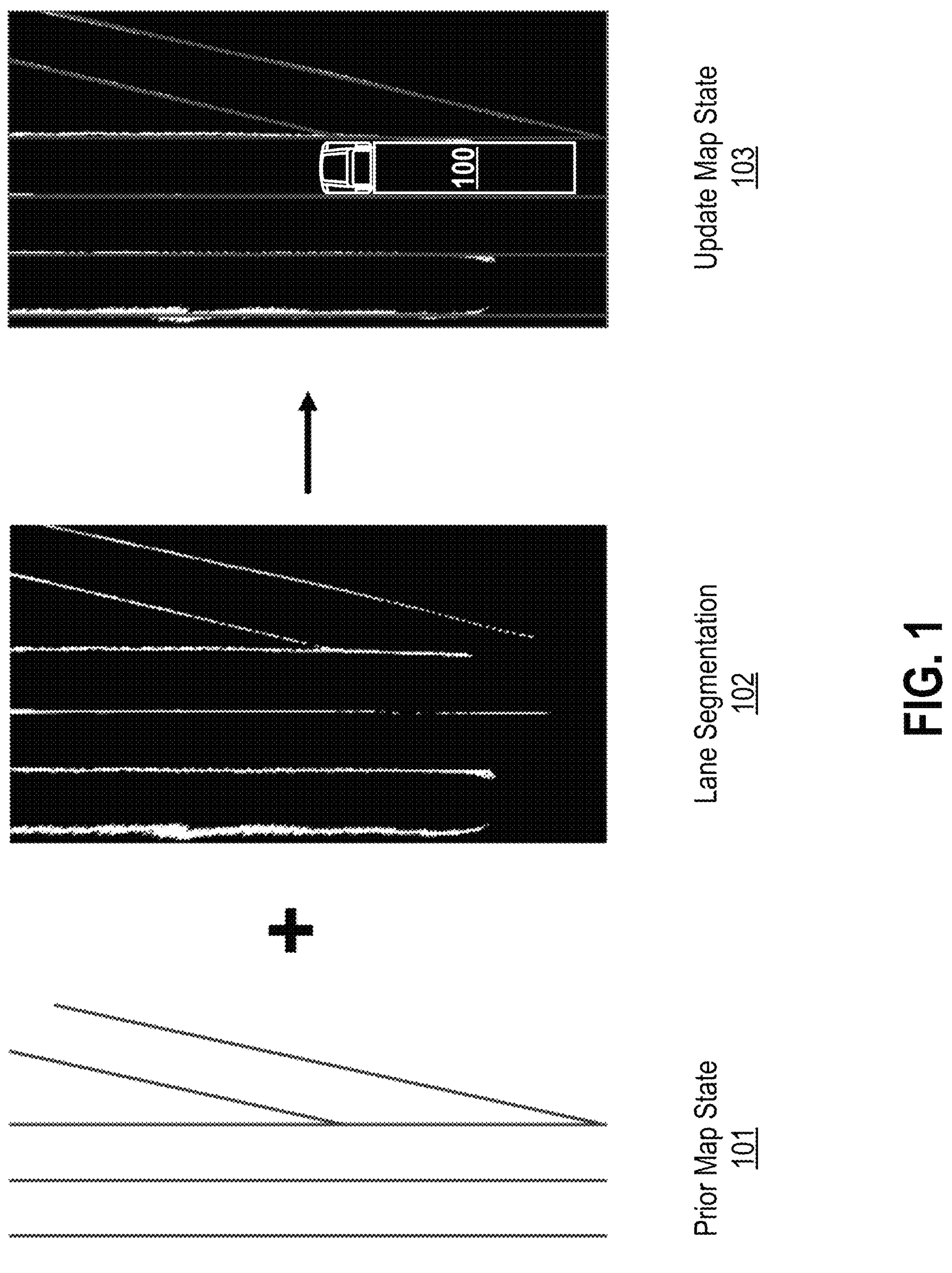
FIG. 1 shows an example method for controlling an autonomous vehicle by dynamically creating maps based on lane segmentation, according to various embodiments of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. These terms are merely intended to distinguish one component from another component, and the terms do not limit the nature, sequence or order of the constituent components.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit," "-er," "-or," and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated.

In addition, terms of relative position such as "vertical" and "horizontal," or "front" and "rear," when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility," and the like each refer to a non-transitory device on which computer-readable data, programming instructions or both are stored. Except where specifically stated otherwise, the terms "memory," "memory device," "computer-readable storage medium," "data store," "data storage facility," and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "instructions" and "programs" may be used interchangeably herein. The instructions may be stored in object code format for direct processing by the processor, or in any other computing device language, including scripts or collections of independent source code modules that are interpreted on demand or compiled in advance. Functions, methods, and routines of the instructions are explained in more detail below. The instructions may be any set of instructions to be executed directly (such as machine code)

or indirectly (such as scripts) by the processor. For example, the instructions may be stored as computing device code on the computing device-readable medium.

The term "data" may be retrieved, stored or modified by processors in accordance with a set of instructions. For instance, although the claimed subject matter is not limited by any particular data structure, the data may be stored in computing device registers, in a relational database as a table having a plurality of different fields and records, XML documents or flat files. The data may also be formatted in any computing device-readable format.

The term "module" or "unit" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, trucks, sports utility vehicles, vans, buses, commercial vehicles, etc.), boats, drones, trains, and the like.

The term "autonomous vehicle," "automated vehicle," "AV," or "driverless vehicle," as used herein, refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle. Autonomous vehicles may be any type of vehicle including, but not limited to, cars, trucks, motorcycles, busses, recreational vehicles, agricultural vehicles, construction vehicles etc. According to various embodiments, autonomous vehicles may include a throttle control system and a braking system. Autonomous vehicles may include one or more engines and/or one or more computing devices. The one or more computing devices may be separate from the automated speed control system or the braking system. Additionally, the computing device may include a processor and/or a memory. The memory may be configured to store programming instructions that, when executed by the processor, are configured to cause the processor to perform one or more tasks. In certain embodiments, autonomous vehicles may include a receiver configured process the communication between autonomous vehicles and a teleoperation system.

The term "trajectory" or "map" is used broadly to include, for example, a motion plan or any path or route from one place to another; for instance, a path from a pickup location to a drop off location.

Although certain embodiments are described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules, and the processor is specifically configured to execute said modules to perform one or more processes which are described further below.

Further, the control logic of the present disclosure may be embodied as non-transitory computer-readable media on a computer-readable medium containing executable programming instructions executed by a processor, controller, or the like. Examples of computer-readable media include, but are not limited to, ROM, RAM, compact disc (CD)-ROMs, magnetic tapes, floppy disks, flash drives, smart cards, and optical data storage devices. The computer-readable medium can also be distributed in network-coupled computer systems so that the computer-readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example, within two standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, systems and methods for controlling a vehicle in response to an abnormal condition, according to embodiments of the present disclosure, will be described with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

With reference to FIG. 1, autonomous vehicles, e.g., an autonomous vehicle 100, may be used to bring goods or passengers to desired locations safely. There should be a high degree of confidence that autonomous vehicles will navigate through surface streets (e.g., city streets, side streets, neighborhood streets, etc.) and on highways (e.g., multi-lane roads) along a trajec route. However, during transit on a road (e.g., a highway, multi-lane roads) along a route between two places, the autonomous vehicle 100 cannot always rely on pre-generated trajectories, which are highly expensive to upkeep. For example, the autonomous vehicle may enter a road with narrowed lanes due to barriers, a construction zone, or a road with missing lane edge lines due to repainting or construction. In these situations, the prior map may be incorrect or diverge from re-formed lanes (e.g., repainted lanes, narrowed lanes).

The existing methods use sparse maps to align what has been generated previously. However, this approach comes with several problems: (a) they may incorrectly segment lane lines due to lack of global context; (b) incorrect prior maps (due to frequent changes in lane markings) can lead to driving down a wrong or imaginary path; (c) they may have false positive lane line detections due to occlusion, repainted lines, and repaved roads; and (d) they always require an accurate prior map and do not make full use of available information from sensors.

Accordingly, this disclosure provides methods and systems for controlling an autonomous vehicle through dynamic map creation based on real time lane segmentation 102. During the process, prior map state 101 is continuously updated to generate a new map state 103. As a result of using the new map state according to the processes of the present disclosure, autonomous vehicles 100 can detect a nominal path, as determined or represented by, e.g., lanes, lane lines, lane edges, road boundaries, centerlines, of a driving surface to effectively and safely navigate within a current lane, through lane changes, through intersections, and/or through other features of the driving surface in a variety of road and weather conditions. As used herein, the term "map state" refers to a series of sequential nodes that represent the map as polylines, while the term "lane segmentation" refers to an image (e.g., grayscale image) of the predicted lane lines.

Figure 2A:
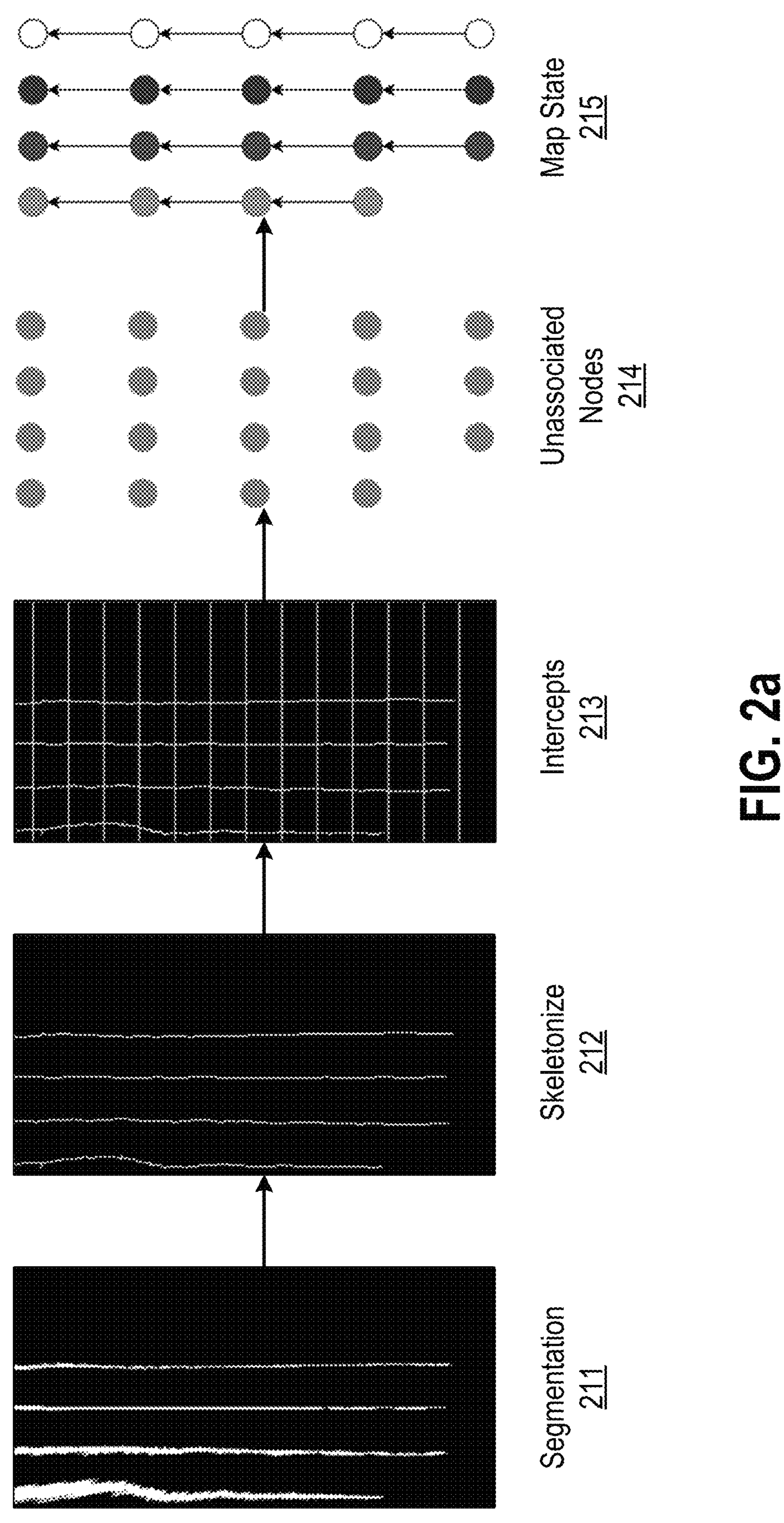
FIG. 2*a* shows an example process for updating a map state based on lane segmentation, according to various embodiments of the present disclosure.

Referring now to FIG. 2*a*, a method for controlling an autonomous vehicle 100 through dynamic map creation based on real time lane segmentation. In some embodiments, the dynamic map creation based on lane segmentation may be initiated once the autonomous vehicle enters a highway or other multi-lane roads.

At 211, the method may include performing lane segmentation for at least a portion of a road (e.g., highway) over which the autonomous vehicle is driving to determine lane edges. In some embodiments, lane segmentation may be carried out based at least in part on sensor data, such as image data. In some embodiments, the sensor data may include the sensor data generated by one or more forward-facing cameras (e.g., a center or near-center mounted camera (s)), such as a wide-view camera, a surround camera, a stereo camera, and/or a long-range or mid-range camera. This sensor data may be useful for computer vision and/or perception when navigating, e.g., within a lane, through a lane change, through a turn, through an intersection, etc., because a forward-facing camera may include a field of view (e.g., the field of view of the forward-facing stereo camera and/or the wide-view camera) that includes both a current lane of travel of the autonomous vehicle, adjacent lane(s) of travel of the autonomous vehicle, and/or boundaries of the driving surface.

In some embodiments, more than one camera or other sensor (e.g., LIDAR sensor, RADAR sensor, etc.) may be used to incorporate multiple fields of view (e.g., the fields of view of the long-range cameras, the forward-facing stereo camera, and/or the forward facing wide-view camera). In some embodiments, real-time visual sensor data (e.g., data representative of images and/or videos, LIDAR data, RADAR data, etc.) may be received from sensors (e.g., one or more cameras, one or more LIDAR sensors, one or more RADAR sensors, etc.) located on an autonomous vehicle. In some embodiments, sensor data may include image data representing an image(s), image data representing a video (e.g., snapshots of video), and/or sensor data representing fields of view of sensors (e.g., LIDAR sensor, RADAR sensor, etc.).

In some embodiments, lane segmentation may be performed by using a lane detection and segmentation model. For example, one or more machine learning models that are computationally inexpensive and capable of real-time deployment may be used to detect lanes and boundaries. The machine learning model may be trained with a variety of annotations as well as a variety of transformed images such that the machine learning model is capable of detecting lanes and boundaries in an accurate and timely manner, especially at greater distances. The machine learning model may be trained using low-resolution images, region of interest images (e.g., cropped images), and transformed images (e.g., spatially augmented, color augmented, etc.). The machine learning model may also be trained using both binary and multi-class segmentation masks, further increasing the accuracy of the model. In some embodiments, image data may be fed into a neural network model (e.g., convolutional neural network (CNN, or ConvNet), deep neural network (DNN)) trained for recognizing nominal path. In some embodiments, the nominal path may be determined or represented by any road attributes, such as lane lines, lane edges, road edges, road boundaries, centerlines, road surface from an image, road surface from LIDAR, etc.

At 212, to initialize the map, the segmentation may be skeletonized to a thin pixel-width. Skeletonization is a process for reducing foreground regions in a binary image to a skeletal remnant that largely preserves the extent and connectivity of the original region while throwing away most of the original foreground pixels. For example, skeletonization may reduce nominal path (e.g., lane lines, lane edges, road edges, road boundaries, centerlines, road surface from an image, road surface from LIDAR, etc.) to 1 pixel wide representation. Skeletonization of lane segmentation is useful for feature extraction, and/or representing a topology of nominal path, for example.

At 213 and 214, the method may further include applying imaginary horizontal lines across the segmentation to find intercepts to generate a plurality of nodes. In some embodiments, the nodes may be represented simply as a vector of 2D positions in a local frame. These unassociated nodes may be initialized with a constant covariance in the lateral and longitudinal direction aligned with the vehicle's ego pose.

At 215, the method may additionally include associating the nodes along the nominal path by their lateral position to become a map state. In some embodiments, associating the nodes along a nominal path (e.g., lane lines, lane edges, road edges, road boundaries, centerlines, road surface from an image, road surface from LIDAR, etc.) may involve extending a segmentation polyline from a node near to the autonomous vehicle to an adjacent node on the same lane edge that is further to the autonomous vehicle. In some embodiments, associating the nodes along a nominal path may involve angle optimization to minimize or eliminate the risk of cross-association of nodes on a different nominal path.

Figure 2B:
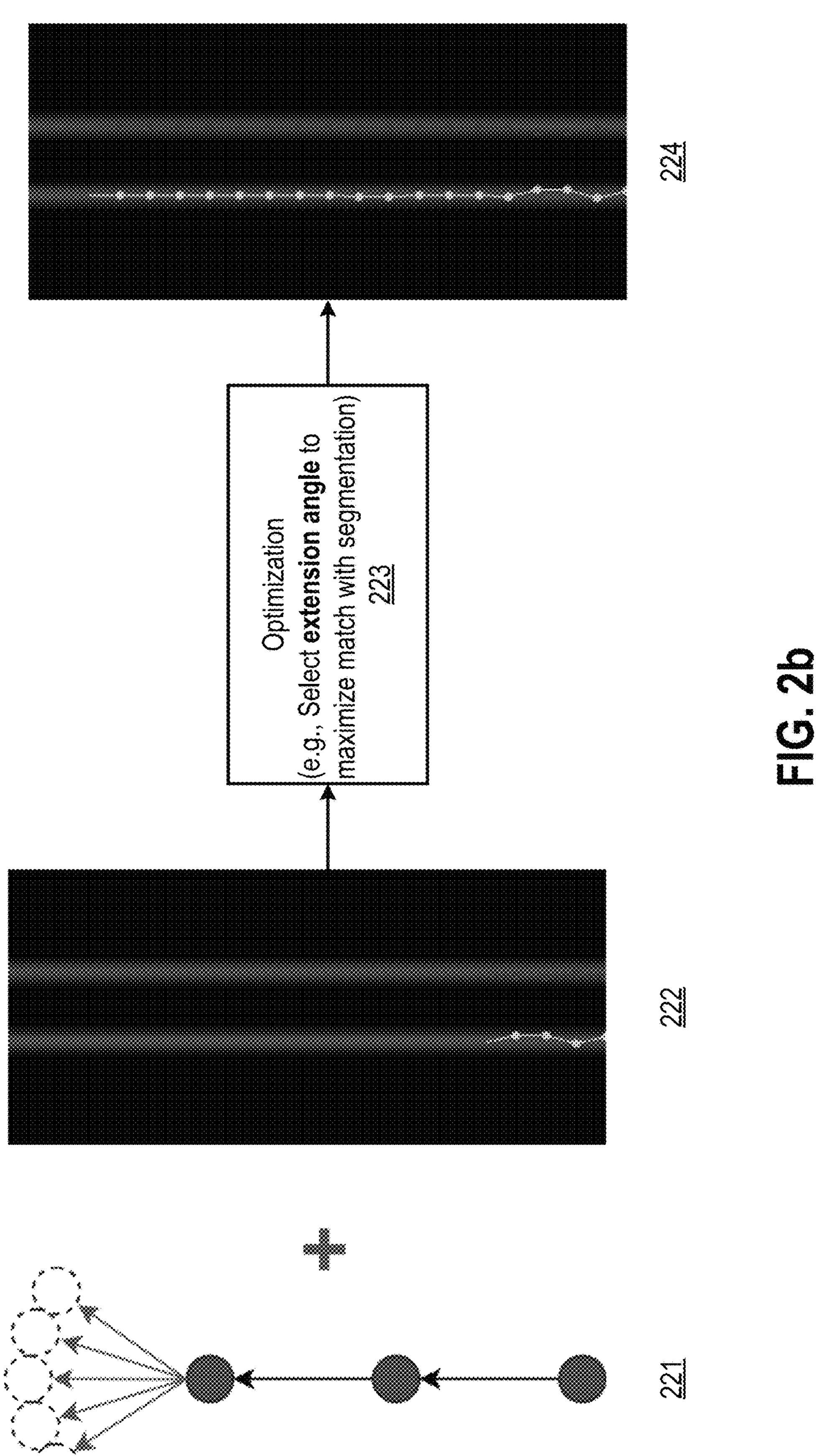
FIG. 2*b* shows an example process for extending segmentation polylines by incrementally associating nodes along lane edges, according to various embodiments of the present disclosure.

Referring now to FIG. 2*b*, an example process for associating nodes 221 to extend segmentation polylines 222 is depicted. During extension, the extension distance is fixed, but an extension angle remains to be optimized at 223. In some embodiments, a Ceres solver, a non-linear optimizer library, may be used to solve this problem by finding the angle that provides the best segmentation at the tip of the extension. By repeating this process in many iterations, the initial map state can be extended to match the segmentation in a straight line 224.

According to various embodiments of this disclosure, the polyline, segmentation, and extension length may be passed into the residual functor, which calculates the residuals that need to be minimized for its optimization. The map state nodes may be transformed into the ego frame (static relative to the autonomous vehicle) and overlaid on top of the incoming bird's eye view segmentation to extend and match the lane segmentation with a fixed extension length limit (e.g., meters). In some embodiments, the getRectSubPix( ) function in OpenCV may be used to pinpoint a correct angle to extend with sub-pixel accuracy through linear interpolation. Further, the residual may be inverted by subtracting from the maximum pixel value (e.g., 255), transforming the extension problem to a residual minimization problem (to match the highest segmentation confidence) that the Ceres solver can solve. The initial angle to extend may be based on the heading of the node, defined by the angle formed by the current node and the previous node.

Figure 2C:
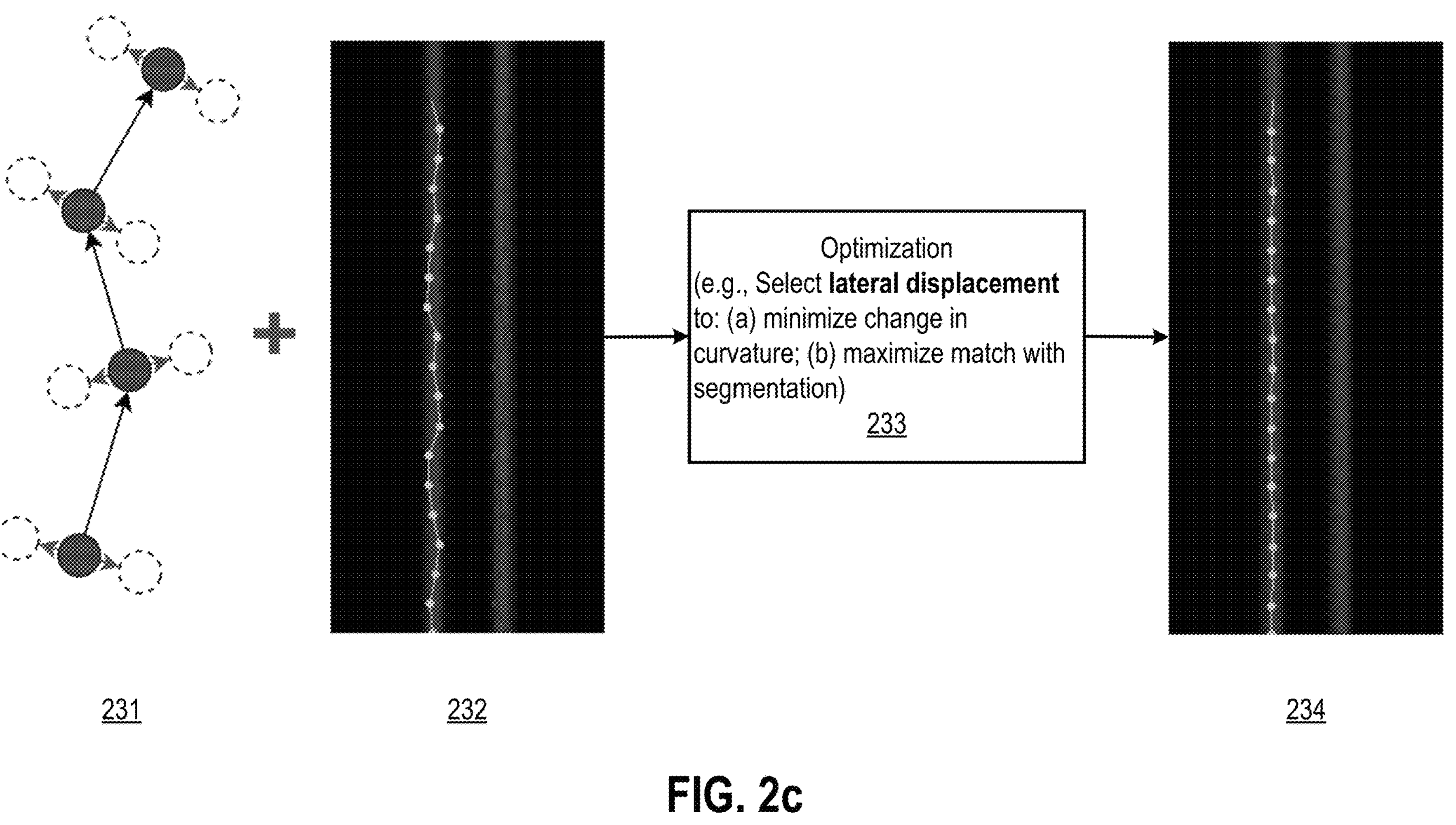
FIG. 2*c* shows an example process for fitting segmentation polylines with lane edges, according to various embodiments of the present disclosure.

Referring now to FIG. 2*c*, an example process for updating node positions 231 on the segmentation polylines 232 is depicted. The update step aligns the map with the most recent segmentation 234. During the update, a lateral displacement of every node in the map state may be optimized at 233 to (a) minimize change in curvature of segmentation polylines, and (b) maximize match between at least one segmentation polyline and its corresponding nominal path (e.g., lane lines, lane edges, road edges, road boundaries, centerlines, road surface from an image, road surface from LIDAR, etc.).

Updating node positions on the segmentation polylines is similar, for example, to extending nodes on segmentation polylines, but adds a cost to changing curvature throughout the polyline. Instead of optimizing for the extension angle ahead of each polyline's head node, the lateral displacement of all nodes on the polylines may be optimized. In some embodiments, the curvature for three points on a curve may be defined by the Menger Curvature function. The residual may be calculated using a change in Menger curvature from three consecutive points to the next three consecutive points, which may be expressed as Curvature{[p1, p2, p3}-Curvature{p0, p1, p2}. By applying this residual to all polylines, the curvature can be smoothed out alongside adjusting to better match the segmentation based on lateral displacement of nodes.

Figure 3:
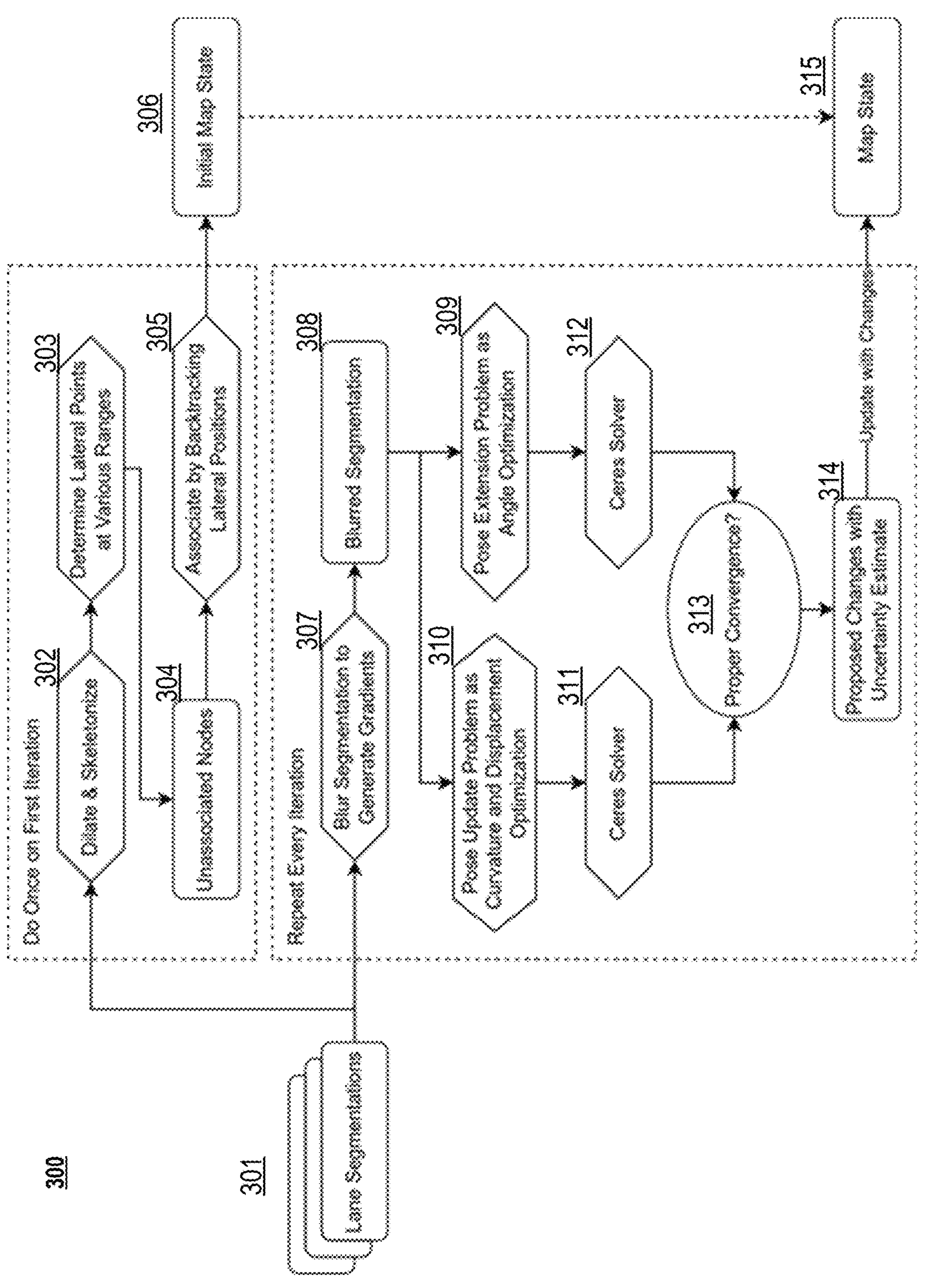
FIG. 3 shows an example process for updating a map state for controlling an autonomous vehicle based on lane segmentation, according to various embodiments of the present disclosure.

Referring now to FIG. 3, an example method 300 may be implemented to control the autonomous vehicle 100 through dynamic map creation based on lane segmentation, in accordance with various embodiments of the present disclosure. In some embodiments, steps described herein in lane segmentation may be iteratively performed to achieve desired precision and/or accuracy.

At 301, the method 300 may start with lane segmentation of a driving surface (e.g., highways, multi-lane roads) in a field view of the autonomous vehicle 100. In some embodiments, lane segmentation may be in the bird's eye view perspective and may be computed by a lane detection segmentation model. In some embodiments, the lane detection segmentation model may achieve up to 90% or better average precision for lane lines. In some embodiments, the resulting lane segmentation may be bottom centered on the cameras that can be mounted, e.g., in the front left, center, and right of the self-driving vehicle. In some embodiments, the lane segmentation may be represented by a rectangular grid of predictions discretized into the form of a matrix with a range of about 100 meters (about 400 pixels) and width of about 20 meters (about 200 pixels). The size of the matrix may be variable and can be adjusted for each use case.

At 302, the method 300 may include dilating and/or skeletonizing lane segmentation. For example, dilation and skeletonization of the lane segmentation for initialization may be carried out through OpenCV functions dilate( ) and thinning( ), respectively. In some embodiments, dilation may have a kernel size of about 5. In some embodiments, the output thinned segmentation may have a pixel width of 1.

Dilate( ) is an OpenCV function in Python that applies a morphological filter to images. The cv2. dilate( ) takes two inputs, of which one is the input image and the second is called the structuring element or kernel, which decides the nature of the operation. Image dilation increases the object area. Thinning( ) is the operation that takes a binary image and contracts the foreground until only single-pixel wide lines remain. In some embodiments, skeletonization of lane segmentation may be carried out using the Guo-Hall algorithm (Guo, Z. and Hall, R. W. (1989). *Parallel thinning with two subiteration algorithms*, Communications of the ACM 32(3): 359-373).

At 303, the method 300 may include determining lateral points at various ranges. For example, at discrete range intervals (e.g., 5 meters) away from the autonomous vehicle, nodes may be initialized at those range intervals where the skeletonized lane segmentation exists. Initial skeletonization of lane segmentation to a width of 1 pixel allows unambiguous assignments of nodes, because there is only one intercept per lane line.

At 304 and 305, the method 300 may include associating nodes. Nodes that are currently unassociated may be represented with a vector of two-dimensional (2D) positions in a local frame. According to various embodiments of the present disclosure, the unassociated nodes may be initialized with a constant covariance in the lateral and longitudinal direction aligned with an ego pose of the autonomous vehicle.

In some embodiments, nodes may be associated to generate polylines incrementally, starting with near nodes and towards further nodes. For example, the points nearest to the autonomous vehicle may form the starting nodes of the polylines. If there is no node closer to the autonomous vehicle within a lateral displacement limit (e.g., one-meter lateral displacement) of the node, a new polyline may be generated with that node as the head. If there is a node closer to the vehicle within the lateral displacement limits, it may become the predecessor of the node in question. In some embodiments, this process may output a vector of polylines that contain nodes, with further nodes connected as successors of the closer nodes.

At 306, the method 300 may include adding the newly generated polylines, as described above, to an initial map state to obtain an updated map state. In some embodiments, the initial map state may contain the polylines that are all associated to lane segments. Each lane segment holds two pointers, one to the left polyline and one to the right polyline. These polylines can be accessed through a shared pointer. All nodes in the map state are in a local frame, which is set at the start of the journey and does not move with the autonomous vehicle.

In some embodiments, if needed, steps 302, 303, 304, and 305 may be performed once on first iteration.

At 307 and 308, the method 300 may include blurring segmentation to generate gradients. According to various embodiments of the present disclosure, segmentation alone may not enable an upcoming non-linear least squares solver to work as it requires gradients over the pixel space to gradually climb to the maximum or minimum. Accordingly, in some embodiments, a blur function (e.g., gaussian blur) may be applied to the segmentation to not only extend the accessible range of angles that contain segmentation for the solver, but also provide smooth gradients to search about. In some embodiments, the gaussian blur may have a kernel size of 23 and a standard deviation of 4. In some embodiments, the blurred segmentation may be a bird's eye view perspective grid, but more spread out with smooth gradients due to the applied blur.

At 309, the method 300 may include solving an extension problem by angle optimization. The extension problem enables each polyline to trace and follow the segmentation by extending from the head (the node with no successor furthest from the vehicle) once when there is space to extend. However, with improved lane segmentation as described herein, this range can be extended further when the corresponding clean segmentation range has improved. According to various embodiments of the present disclosure, the polyline, segmentation, and extension length may be passed into the residual functor, which calculates the residuals that need to be minimized for its optimization. In some embodiments, the map state nodes may be transformed into the ego frame (static relative to the autonomous vehicle) and overlaid on top of the incoming bird's eye view segmentation to extend and match the lane segmentation with a fixed extension length (e.g., 5 meters fixed extension length). By using the getRectSubPix(function in OpenCV, a correct angle to extend with sub-pixel accuracy through linear interpolation may be pinpointed. Then, the residual may be inverted by subtracting from the maximum pixel value such as 255, which presents the extension problem as a residual minimization problem (to match the highest segmentation confidence) that the Ceres solver expects and is designed to solve. Accordingly, the initial angle to extend is based on the heading of the node, defined by the angle formed by the current node and the previous node.

At 310, the method 300 may include solving an update problem as curvature and displacement optimization. In contrast with the extension problem, the update problem adds a cost to changing curvature throughout the polyline. Instead of optimizing for the extension angle ahead of each polyline's head node, the solver now solves for the lateral displacement of all nodes on the polylines. According to various embodiments of the present disclosure, the curvature for three points on a curve may be defined by the Menger curvature function. The Menger Curvature function introduces a non-local curvature that is a function of 3 points and defines the curvature to be the inverse of the radius of the unique circle containing all 3 points. The Menger curvature function can be used to determine the curvature of a set that may not be differentiable. Accordingly, in some embodiments, the residual may be calculated using the change in Menger curvature from three consecutive points to the next three consecutive points, expressed as Curvature{[p1, p2, p3}-Curvature{p0, p1, p2}. By applying this residual to all polylines, the curvature can be smoothed out alongside adjusting to better match the segmentation based on lateral displacement of nodes.

At 311 and 312, the method 300 may include solving the extension problem and/or the update problem using a Ceres solver. The Ceres solver is a library that enables modeling and solving of complex optimization problems, such as non-linear least squares of residuals. According to various embodiments of the present disclosure, the extension and update steps may be framed in a manner that is interpretable by the solver for solving the angle and displacement.

At 313, the method 300 may include obtaining convergence while solving the extension and update problems. For example, convergence may be obtained directly from the Ceres solver or other parameters that can be measured, such as the optimized normalized residual, cost change, gradients, or step sizes.

At 314, the method 300 may include determining changes to the initial map state. In some embodiments, the changes may include an uncertainty estimate. Post convergence, there is a proposed angle of extension for all head nodes in each polyline and the lateral displacement for each node in all polylines. In some embodiments, based on the residual, these changes can be assigned a confidence/variance, which can be combined with the current map state through an Extended Kalman Filter to handle the changes akin to a tracking problem. The Extended Kalman Filter, also known as linear quadratic estimation (LQE), is an algorithm that uses a series of measurements observed over time, containing statistical noise and other inaccuracies, and produces estimates of unknown variables that tend to be more accurate than those based on a single measurement alone, by using Bayesian inference and estimating a joint probability distribution over the variables for each timeframe.

In some embodiments, if needed, steps 307-314 may be repeated on every iteration to achieve desired precision and/or accuracy.

At 315, the map state containing the lane segments and polylines may be updated during every cycle, beginning from the initial map state 306.

Figure 4:
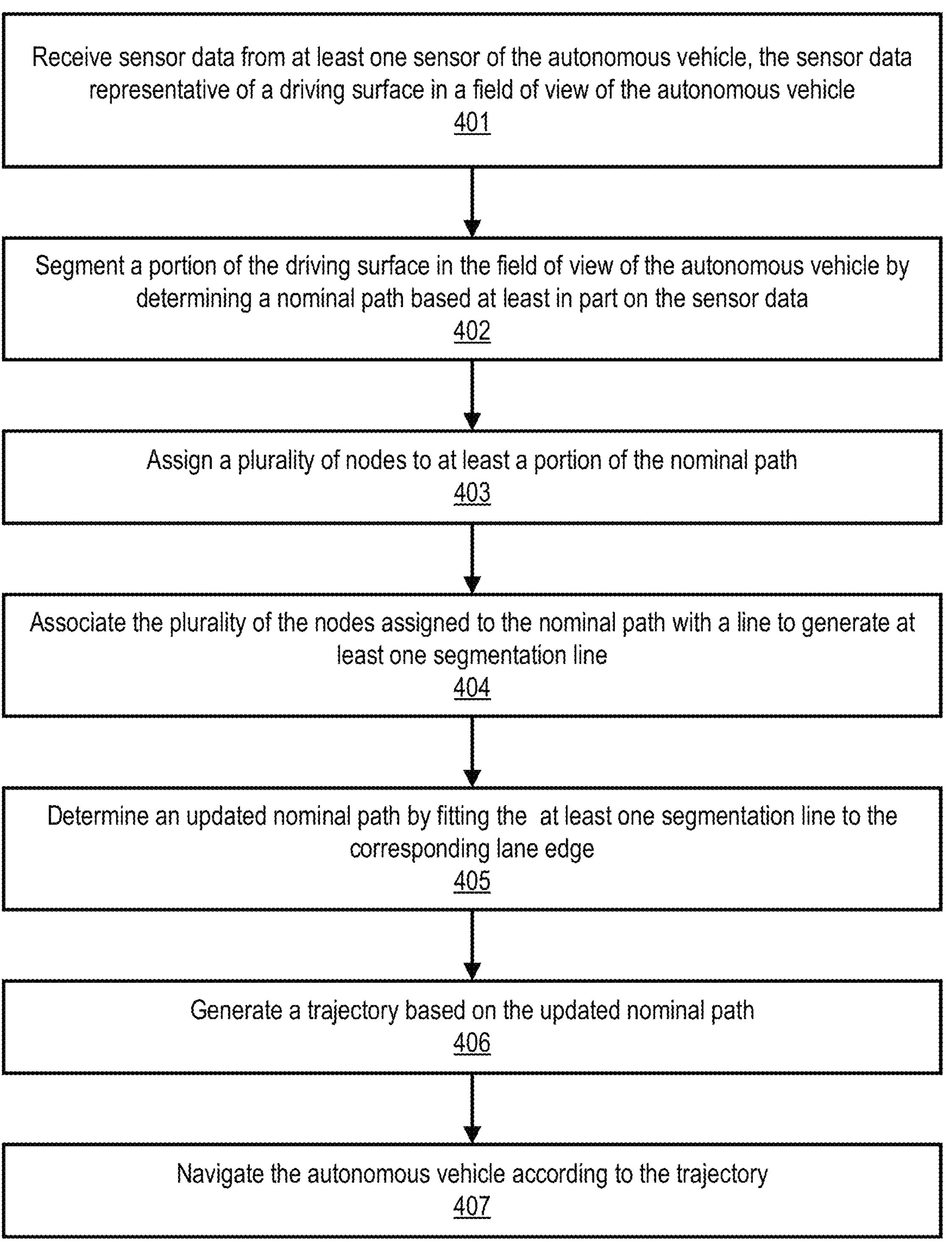
FIG. 4 shows an example method for controlling an autonomous vehicle through dynamic map creation based on lane segmentation, according to various embodiments of the present disclosure.

Referring now to FIG. 4, an example method 400 for controlling an autonomous vehicle 100 through dynamic map creation based on lane segmentation is depicted, in accordance with various embodiments of the present disclosure.

At 401, the method 400 may include receiving sensor data from at least one sensor of the autonomous vehicle. Sensors may include, but are not limited to: LIDAR, RADAR, cameras, monocular or stereo video cameras in the visible light, infrared and/or thermal spectra; ultrasonic sensors, time-of-flight (TOF) depth sensors, speed sensors, temperature sensors, and rain sensors. Accordingly, the sensor data may include LIDAR data, RADAR data, camera data, or any range-sensing or localization data, etc. According to various embodiments, a sensor stream of one or more sensors (e.g., of the same or different modalities) may be fused to form fused sensor data. In some embodiments, the sensor data (e.g., image data) is representative of at least a portion of a driving surface a driving surface over which the autonomous vehicle is driving and/or in a path of the autonomous vehicle.

At 402, the method 400 may include performing lane segmentation for at least a portion of the driving surface in the field of view of the autonomous vehicle by determining nominal path based at least in part on the sensor data, such as the image data acquired by one or more cameras. In some embodiments, the image data may include one or more image frames.

According to various embodiments of this disclosure, lane segmentation may include segmenting the driving surface with a lane detection segmentation model. In some embodiments, the lane detection segmentation model may include a machine-learned segmentation model (e.g., a convolutional neural network) trained to determine a nominal path (e.g., lane lines, lane edges, road edges, road boundaries, centerlines, road surface from an image, road surface from LIDAR, etc.).

In some embodiments, the method 400 may include segmenting the driving surface into rectangular grides represented by a matrix, for example, with a range of about 100 meters and a width of about 20 meters.

According to various embodiments of this disclosure, the method 400 may further include dilating and skeletonizing the nominal path (e.g., lane lines, lane edges, road edges, road boundaries, centerlines, road surface from an image, road surface from LIDAR, etc.). In some embodiments, dilation and skeletonization of the lane segmentation for initialization may be carried out through OpenCV functions dilate( ) and thinning( ), respectively. In some embodiments, dilation may have a kernel size of about 5. In some embodiments, the output thinned segmentation may have a pixel width of 1.

In some embodiments, skeletonization of lane segmentation may be carried out using the Guo-Hall algorithm (Guo, Z. and Hall, R. W. (1989). *Parallel thinning with two subiteration algorithms*, Communications of the ACM 32(3): 359-373).

In some embodiments, the method 400 may include applying a blur function to lane segmentation to generate blurred segmentation. For example, blur can be applied to the pixels using any suitable technique, such as by convolving a kernel with the image. The kernel can include any suitable blurring kernel, such as a Gaussian blur function (e.g., a 3×3 Gaussian blur kernel, a 5×5 Gaussian blur kernel, or the like), a box blur function (e.g., using a 3×3 kernel or the like), disc blur rendering (circular bokeh, hexagonal bokeh, star bokeh, etc.), or other suitable blurring function. The blur kernel (e.g., Gaussian blur kernel or the like) and the image size are variable based on the intensity requested by the user. According to various embodiments of this disclosure, the blur function may include a gaussian blur, such as a two-dimensional Gaussian blur.

At 403 and 404, the method 400 may include assigning a plurality of nodes to at least a portion of a nominal path (e.g., lane lines, lane edges, road edges, road boundaries, centerlines, road surface from an image, road surface from LIDAR, etc.) and associating the plurality of the nodes assigned to the nominal path with a line to generate at least one segmentation polyline, each of which is associated with a nominal path. Generally, a measurement in a measurement space can be carried out using any vector-valued function defined on the 2D space, such as F_bar(x, y), where F_bar is selected from, for example, lane lines, road surface from an image, road surface from LIDAR, centerline, and road edge.

According to various embodiments of this disclosure, the method 400 may include assigning a plurality of nodes to at least a portion of lane segmentation that has been dilated and skeletonized. For example, nodes may be more unambiguously assigned to lane segmentation that has been dilated and skeletonized to pixel of 1.

In some embodiments, the method 400 may include extending at least one segmentation polyline by incrementally associating additional nodes in an adjacent portion of the driving surface that is further to the autonomous vehicle. For example, each segmentation polyline may be extended to trace and follow the segmentation by extending from the head node (the node with no successor furthest from the vehicle) once when there is space to extend. In some embodiments, the method 400 may include extending segmentation polylines by incrementally associating nodes near to the autonomous vehicle to nodes further to the autonomous vehicle.

In some embodiments, associating nodes may carried out through angle optimization. To perform angle optimization, the polyline, segmentation, and extension length may be passed into the residual functor, which calculates the residuals that need to be minimized for its optimization. In some embodiments, the map state nodes may be transformed into the ego frame (static relative to the autonomous vehicle) and overlaid on top of the incoming bird's eye view segmentation to extend and match the lane segmentation with a fixed extension length limit (e.g., 5, 6, 7, 8, 9, or 10 meters). A correct angle to extend with sub-pixel accuracy through linear interpolation may be determined by using the getRectSubPix( ) function in OpenCV. The initial angle to extend may be based on the heading of the node, defined by the angle formed by the current node and the previous node. In addition, by inverting the residual and subtracting from the maximum pixel value (e.g., 255), the segmentation polylines may be extended by solving a residual minimization problem, using, e.g., a Ceres solver.

At 405, the method 400 may include determining AN updated nominal path (e.g., lane lines, lane edges, road edges, road boundaries, centerlines, road surface from an image, road surface from LIDAR, etc.) by fitting at least one segmentation line to the nominal path. In this process, polylines are updated via optimization of many costs coming from measurements (see 403 and 404) and priors (map, lane width, minimized curvature, etc.).

In some embodiments, fitting the at least one segmentation polyline comprises minimizing curvature change between two adjacent sets of nodes on the same segmentation line. In some embodiments, a curvature of at least one of the two adjacent sets of nodes may be defined by a Menger Curvature function. In some embodiments, at least one of the two adjacent sets of nodes comprises three nodes. In some embodiments, the processor may be configured to maximize match between each of the plurality of segmentation lines with its nominal path. In some embodiments, the step of fitting may be repeated until a match between each of the plurality of segmentation lines with its nominal path is maximized globally for all nominal path of lane segmentation.

In some embodiments, the method 400 may include solving an update problem as curvature and displacement optimization. According to various embodiments of the present disclosure, the curvature for three points on a curve may be defined by the Menger curvature function. Accordingly, in some embodiments, the residual may be calculated using the change in Menger curvature from three consecutive points to the next three consecutive points, which may be expressed Curvature{[p1, p2, p3}-Curvature{p0, p1, p2}. By applying this residual to all polylines, the curvature can be smoothed out alongside adjusting to better match the segmentation based on lateral displacement of nodes.

At 406, the method 400 may include generating a trajectory based on the updated nominal path. In some embodiments, the method 400 may include generating the trajectory by updating an existing trajectory or generating a new trajectory.

At 407, the method 400 may include controlling the autonomous vehicle according to the generated trajectory.

Figure 5:
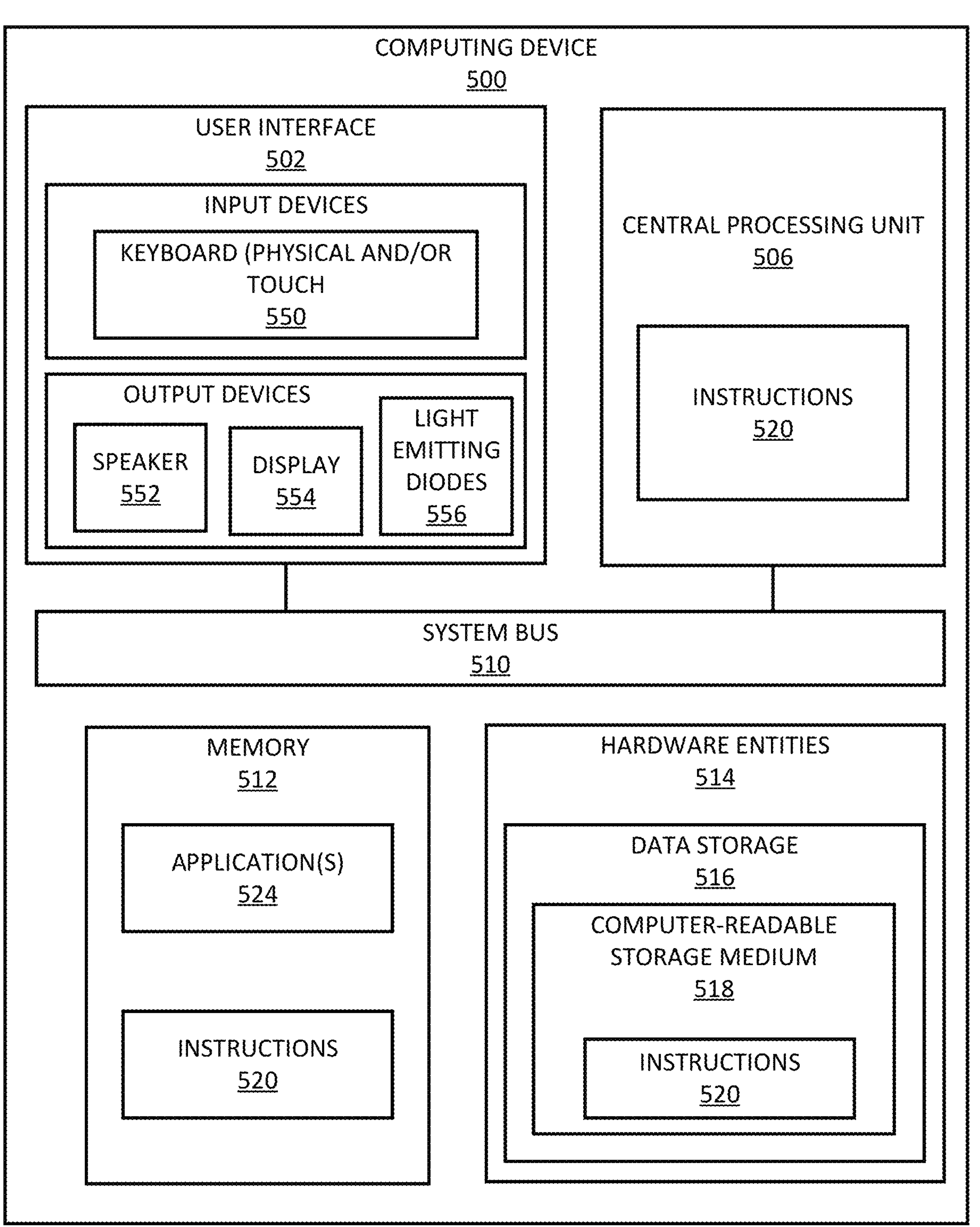
FIG. 5 shows example elements of a computing device, according to various embodiments of the present disclosure.

Referring now to FIG. 5, an illustration of an example architecture for a computing device 500 is provided. Computing device 500 may include more or fewer components. The hardware architecture of FIG. 5 represents one example implementation of a representative computing device configured to one or more methods and means for controlling the autonomous vehicle 100 in response to an abnormal condition of the autonomous vehicle 100, as described herein. As such, the computing device 500 of FIG. 5 implements at least a portion of the method(s) described herein (for example, method 300 of FIG. 3 and/or method 400 of FIG. 4).

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices and output devices, which facilitate user-software interactions for controlling operations of the computing device 500. The input devices may include, but are not limited to, a physical and/or touch keyboard 550. The input devices can be connected to the computing device 500 via a wired or wireless connection (e.g., a Bluetooth® connection). The output devices may include, but are not limited to, a speaker 552, a display 554, and/or light emitting diodes 556.

At least some of the hardware entities 514 perform actions involving access to and use of memory 512, which can be a Random Access Memory (RAM), a disk driver and/or a Compact Disc Read Only Memory (CD-ROM), among other suitable memory types. Hardware entities 514 can include a data storage 516 comprising a computer-readable storage medium 518 on which is stored one or more sets of instructions 520 (e.g., programming instructions, such as, but not limited to, software code) configured to implement one or more of the methodologies, procedures, or functions described herein. The instructions 520 and applications 524 can also reside, completely or at least partially, within the memory 512 and/or within the CPU 506 during execution thereof by the computing device 500. The memory 512 and the CPU 506 also can constitute machine-readable media. The term "machine-readable media," as used here, refers to a single medium or multiple media (e.g., a centralized or distributed database, and/or associated caches and servers) that store the one or more sets of instructions 520. The term "machine-readable media," as used here, also refers to any medium that is capable of storing, encoding or carrying a set of instructions 520 for execution by the computing device 500 and that cause the computing device 500 to perform any one or more of the methodologies of the present disclosure.

Figure 6:
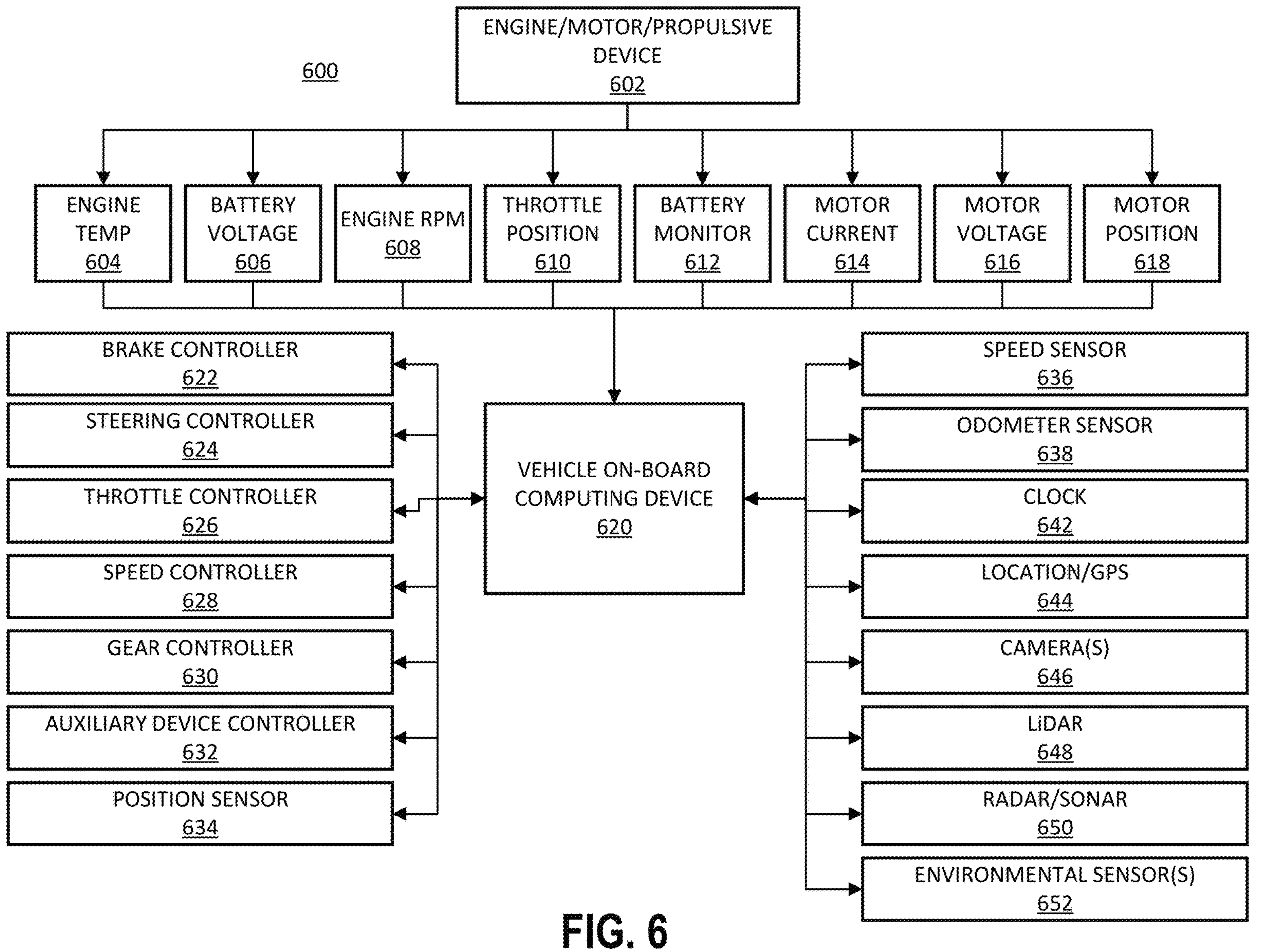
FIG. 6 shows an example architecture of a vehicle, according to various embodiments of the present disclosure.

Referring now to FIG. 6, an example vehicle system architecture 600 for a vehicle is provided, in accordance with various embodiments of the present disclosure.

The autonomous vehicle 100 can have the same or similar system architecture as shown in FIG. 6. Thus, the following discussion of vehicle system architecture 600 is sufficient for understanding the autonomous vehicle 100.

As shown in FIG. 6, the vehicle system architecture 600 includes an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may include, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may have an electric motor, and accordingly will have sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles include, for example, a position sensor 634, such as an accelerometer, gyroscope and/or inertial measurement unit; a speed sensor 636; and/or an odometer sensor 638. The vehicle system architecture 600 also may have a clock 642 that the system uses to determine vehicle time during operation. The clock 642 may be encoded into the vehicle onboard computing device 620. It may be a separate device, or multiple clocks may be available.

The vehicle system architecture 600 also may include various sensors that operate to gather information about the environment in which the vehicle is traveling. These sensors may include, for example, a location sensor 644 (for example, a Global Positioning System (GPS) device); object detection sensors such as one or more cameras 646; a LiDAR sensor system 648; and/or a radar and/or a sonar system 650. The sensors also may include environmental sensors 652, such as a precipitation sensor and/or ambient temperature sensor. The object detection sensors may enable the vehicle system architecture 600 to detect objects that are within a given distance range of the vehicle 600 in any direction, while the environmental sensors 652 collect data about environmental conditions within the vehicle's area of travel.

During operations, information is communicated from the sensors to an onboard computing device 620. The onboard computing device 620 may be configured to analyze the data captured by the sensors and/or data received from data providers, and may be configured to optionally control operations of the vehicle system architecture 600 based on the results of the analysis. For example, the onboard computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers, such as auxiliary device controller 632.

Geographic location information may be communicated from the location sensor 644 to the onboard computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 are communicated from those sensors to the onboard computing device 620. The object detection information and/or captured images are processed by the onboard computing device 620 to detect objects in proximity to the vehicle. Any known or to be known technique for making an object detection based on sensor data and/or captured images may be used in the embodiments disclosed in this document.

The present disclosure is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A method for navigating an autonomous vehicle, comprising:

receiving sensor data from at least one sensor of the autonomous vehicle, the sensor data representative of a driving surface in a field of view of the autonomous vehicle; and using a processor:

segmenting a portion of the driving surface in the field of view of the autonomous vehicle by determining a nominal path based at least in part on the sensor data;

assigning a plurality of nodes to at least a portion of the nominal path;

initializing the plurality of nodes with a constant covariance in the lateral and longitudinal direction aligned with an ego pose of the autonomous vehicle, wherein the constant covariance represents an uncertainty estimate for the plurality of nodes that is used in a probabilistic optimization framework to update node positions;

associating the plurality of the nodes assigned to the nominal path with a line to generate at least one segmentation polyline;

extending the at least one segmentation polyline by incrementally associating nodes near to the autonomous vehicle to nodes further from the autonomous vehicle through angle optimization;

determining an updated nominal path by fitting the at least one segmentation polyline to the nominal path, wherein fitting comprises solving an update problem by optimizing lateral displacement of the plurality of nodes to minimize curvature change and maximize match with the nominal path;

generating a trajectory based on the updated nominal path; and navigating the autonomous vehicle according to the trajectory.

2. The method of claim 1, wherein the step of segmenting comprises dilating and skeletonizing the nominal path.

3. The method of claim 1, wherein the step of segmenting comprises applying a gaussian blur to the nominal path to generate blurred segmentation.

4. The method of claim 1, wherein the step of segmenting comprises segmenting the driving surface with a lane detection segmentation model.

5. The method of claim 1, wherein fitting the at least one segmentation polyline comprises minimizing curvature change between two adjacent sets of nodes on the same segmentation line.

6. The method of claim 5, wherein a curvature of at least one of the two adjacent sets of nodes is defined by a Menger Curvature function.

7. The method of claim 5, wherein at least one of the two adjacent sets of nodes comprises three nodes.

8. The method of claim 1, wherein fitting the at least one segmentation polyline comprises maximizing match between the at least one segmentation polyline and the nominal path.

9. The method of claim 1, comprising, after the step of segmenting, applying imaginary horizontal lines across the segmented portions of the driving surface to find intercepts of the imaginary horizontal lines and the segmented portions of the driving surface, and identifying the intercepts as a plurality of nodes.

10. A system for navigating an autonomous vehicle, comprising:

at least one sensor, configured to receive sensor data representative of a driving surface in a field of view of the autonomous vehicle; and a processor, configured to:

segment a portion of the driving surface in the field of view of the autonomous vehicle by determining a nominal path based at least in part on the sensor data;

assign a plurality of nodes to at least a portion of the nominal path;

initialize the plurality of nodes with a constant covariance in the lateral and longitudinal direction aligned with an ego pose of the autonomous vehicle, wherein the constant covariance represents an uncertainty estimate for the plurality of nodes that is used in a probabilistic optimization framework to update node positions;

associate the plurality of the nodes assigned to the nominal path with a line to generate at least one segmentation polyline;

extend the at least one segmentation polyline by incrementally associating nodes near to the autonomous vehicle to nodes further from the autonomous vehicle through angle optimization;

determine an updated nominal path by fitting the at least one segmentation polyline to the nominal path, wherein fitting comprises solving an update problem by optimizing lateral displacement of the plurality of nodes to minimize curvature change and maximize match with the nominal path;

generate a trajectory based on the updated nominal path; and navigate the autonomous vehicle according to the trajectory.

11. The system of claim 10, wherein the processor is configured to dilate and skeletonize the nominal path.

12. The system of claim 10, wherein the processor is configured to apply a gaussian blur to the nominal path to generate blurred segmentation.

13. The system of claim 10, wherein the processor is configured to segment the driving surface with a lane detection segmentation model.

14. The system of claim 10, wherein the processor is configured to minimize curvature change between two adjacent sets of nodes on the same segmentation line.

15. The system of claim 14 wherein a curvature of at least one of the two adjacent sets of nodes is defined by a Menger Curvature function.

16. The system of claim 14, wherein at least one of the two adjacent sets of nodes comprises three nodes.

17. The system of claim 10, wherein the processor is configured to maximize match between the at least one segmentation polyline and the nominal path.

18. The system of claim 10, wherein the processor is configured to, after the step of segmenting, apply imaginary horizontal lines across the segmented portions of the driving surface to find intercepts of the imaginary horizontal lines and the segmented portions of the driving surface, and identify the intercepts as a plurality of nodes.

* * * * *